(12) United States Patent
Gokan et al.

(10) Patent No.: US 9,279,359 B2
(45) Date of Patent: Mar. 8, 2016

(54) PISTON COOLING APPARATUS (71) Applicants: HONDA MOTOR CO., LTD., Tokyo (JP); HIKARI SEIKO CO., LTD., Kuwana-shi, Mie (JP)

(72) Inventors: Yoshitsugu Gokan, Wako (JP); Tomokazu Kobayashi, Wako (JP); Takayuki Osako, Wako (JP); Masatoshi Ito, Wako (JP); Kenichi Nishimura, Kuwana (JP); Keiji Yamamoto, Kuwana (JP); Masaki Sabato, Kuwana (JP)

(73) Assignees: HONDA MOTOR CO., LTD., Tokyo (JP); HIKARI SEIKO CO., LTD., Kuwana-Shi (JP)

(*) Notice: Subject to any disclaimer, the term of this patent is extended or adjusted under 35 U.S.C. 154(b) by 0 days.

(21) Appl. No.: 14/449,475

(22) Filed: Aug. 1, 2014

(65) Prior Publication Data

US 2015/0040846 A1 Feb. 12, 2015

(30) Foreign Application Priority Data

Aug. 6, 2013 (JP) ................. 2013-163283

(51) Int. Cl.
*F02B 75/00* (2006.01)
*F01P 3/10* (2006.01)
*B01D 35/00* (2006.01)
*F01P 3/08* (2006.01)
*F01M 1/08* (2006.01)
*F02B 75/02* (2006.01)
*F02F 1/22* (2006.01)
*F02F 3/20* (2006.01)
*F01P 1/04* (2006.01)

(52) U.S. Cl.
CPC ................. *F01P 3/10* (2013.01); *B01D 35/005* (2013.01); *F01M 1/08* (2013.01); *F01P 3/08* (2013.01); *F01P 1/04* (2013.01); *F02B 2075/025* (2013.01); *F02F 1/22* (2013.01); *F02F 3/20* (2013.01)

(58) Field of Classification Search
CPC ......... F01P 1/04; F02B 2075/025; F02F 3/20; F02F 1/22; F02M 1/08
USPC ........................................ 123/41.39
See application file for complete search history.

(56) References Cited

U.S. PATENT DOCUMENTS 4,862,838 A * 9/1989 Hodgkins et al. .......... 123/41.35

FOREIGN PATENT DOCUMENTS

EP    1391593 A1   2/2004
JP    54-164328   11/1979

OTHER PUBLICATIONS

European Search Report dated Nov. 5, 2014, 6 pages.

*Primary Examiner* — Lindsay Low
*Assistant Examiner* — Charles Brauch
(74) *Attorney, Agent, or Firm* — Rankin, Hill & Clark LLP (57) ABSTRACT

A piston cooling apparatus includes: a main body including a communication passage communicating with an oil path formed in an internal combustion engine; a nozzle pipe portion including an oil injection port configured to inject oil having passed through the communication passage toward a piston; and a filter disposed upstream of the nozzle pipe portion on the flow passage of the oil and including a hole having a smaller diameter than the minimum diameter of the oil injection port, the oil being injected toward the piston from the oil injection port, wherein: the filter is removably mounted on the outer surface of the outer wall portion of the main body existing upstream on the oil flow passage; and the main body is mounted on the internal combustion engine in a state where at least a portion of the filter is inserted into the oil path.

8 Claims, 9 Drawing Sheets

PISTON COOLING APPARATUS

BACKGROUND

1. Field of the Invention

The invention relates to an apparatus for cooling a piston of an internal combustion engine and, specifically, to an apparatus for cooling a piston by injecting oil from the back surface of the piston.

2. Description of the Related Art

Conventionally, as an apparatus for cooling a piston of an internal combustion engine, there is known an apparatus structured such that a nozzle pipe for forming a cooling oil flow passage in communication with an oil path formed within the internal combustion engine is extended toward the back surface of the piston and oil is injected from this nozzle pipe.

This conventional technology, for example, JP-UM-A-S54-164328 provides an integrated structure that a filter is provided within an oil chamber in the main body of a cooling apparatus removably mounted on an internal combustion engine and a nozzle pipe is disposed downstream of the filter. Thus, the filter within the main body is used to prevent the nozzle pipe from being clogged. Since, in the integrated type cooling apparatus with the built-in filter, simultaneously when the cooling apparatus is assembled, the filter is assembled, the assembling efficiency is high.

However, in the structure disclosed in JP-UM-A-S54-164328, since the filter is built within the main body of the cooling apparatus, when maintaining the apparatus, for example, when cleaning and replacing the filter, the main body must be divided and disassembled. Therefore, the maintenance work is complicated. Also, not only the main body must have a structure capable of incorporating and supporting the filter but also, in order that the filter can be mounted onto and removed from the main body, the main body itself must be structured such that it can be divided and reassembled. Thus, the structure of the main body tends to be complicated, thereby raising a possibility that the cost and size of the cooling apparatus can be increased.

On the other hand, in the case that the filter is irremovably mounted on the main body of the cooling apparatus, the structure can be simplified. In this case, however, when maintaining the cooling apparatus, the whole of the cooling apparatus must be replaced, thereby causing the cost to increase.

SUMMARY

The invention is made in view of the above circumstances and thus it is an object of the invention to provide a piston cooling apparatus which can simplify a filter fixing structure, is not complicated in structure, can facilitate the mounting and removal thereof, and can facilitate the maintenance work thereof.

With a view to achieving the object, according to a first aspect of the invention, there is provided a piston cooling apparatus to be mounted on an internal combustion engine, including: a main body including a communication passage communicating with an oil path formed in the internal combustion engine; a nozzle pipe portion including an oil injection port configured to inject oil having passed through the communication passage toward a piston; and a filter disposed upstream of the nozzle pipe portion on the flow passage of the oil and including a hole having a smaller diameter than the minimum diameter of the oil injection port, the oil being injected toward the piston from the oil injection port, wherein: the filter is removably mounted on the outer surface of the outer wall portion of the main body existing upstream on the oil flow passage; and the main body is mounted on the internal combustion engine in a state where at least a portion of the filter is inserted into the oil path.

According to a second aspect of the invention, there is provided the piston cooling apparatus according to the first aspect, wherein: the filter is formed to have a bottomed cylindrical shape including an open end formed by opening one end of the cylindrical outer periphery portion in one end, and a bottom having the hole in the other end; the filter is inserted into the insertion inner wall portion of the oil path in a state where the outer wall portion of the main body is inserted from the open end side into the outer peripheral portion and is engaged therewith; the oil path includes a restrict portion projected toward an oil passage center axis more than the insertion wall portion; and the distance from the open end to the leading end portion, existing upstream on the oil flow passage, is set larger than the distance from the leading end portion of the main body to the restrict portion, in a state where the main body is mounted on the internal combustion engine.

According to a third aspect of the invention, there is provided the piston cooling apparatus according to the second aspect, wherein: the filter includes multiple holes; and a clearance is formed between the bottom and the restrict portion in a state where the main body is mounted on the internal combustion engine.

According to a fourth aspect of the invention, there is provided the piston cooling apparatus according to the second or third aspect, wherein the bottom includes a first surface and a second surface formed in a projecting shape or in a recessed shape in the oil flow passage direction with respect to the first surface; and the holes are formed in both of the first surface and the second surface.

According to a fifth aspect of the invention, there is provided the piston cooling apparatus according to any of the second to fourth aspects, wherein the filter is disposed in such a manner that the bottom and the leading end portion of the main body are separated from each other in a state where it is mounted on the main body.

According to a sixth aspect of the invention, there is provided the piston cooling apparatus according to any of the first to fifth aspects, wherein the filter is formed to have a bottomed cylindrical shape including an outer peripheral portion and the filter is mounted onto the main body with such light pressure insertion operation as enables the outer peripheral portion to be mounted onto and be removed from the outer wall portion.

According to a seventh aspect of the invention, there is provided the piston cooling apparatus according to any of the first to fifth aspects, wherein: the filter is formed to have a bottomed cylindrical shape including an outer peripheral portion; and a female screw section formed in the inner surface of the outer peripheral portion is threadedly engaged with a male screw section formed in the outer wall portion of the main body.

According to an eighth aspect of the invention, there is provided the piston cooling apparatus according to any of the first to fifth aspects, further including: an engaging piece provided in one of the filter and the main body and projected in a direction crossing the axis of the main body; and an engaging groove portion formed in the other of the filter and the main body configured to receive the engaging piece, wherein the engaging piece and the engaging groove portion is engaged with each other; and the engaging groove portion includes a first groove section allowing the movement of the engaging piece along the axis and a second groove section allowing the movement of the engaging piece along the rotation direction around the axis.

According to the first aspect of the invention, since the filter is removably mounted on the outer surface of the upstream side outer wall portion of the main body, with the filter mounted on the main body, the cooling apparatus can be easily mounted onto and removed from the internal combustion engine. Also, since the filter can be accessed directly simply by removing the main body of the cooling apparatus from the internal combustion engine, maintenance work such as the replacement of the filter can be facilitated. Further, since at least a portion of the filter is inserted in the oil path of the internal combustion engine, the filter can be prevented from being removed toward the piston.

According to the second aspect of the invention, the filter has a bottomed cylindrical shape which includes, in one end thereof, an open end formed by opening one end of its outer peripheral portion, and, in the other end, a bottom. The outer wall portion of the main body is inserted from the open end side of the filter into the inside of the outer peripheral portion of the filter, whereby the main body is engaged with the filter. The filter is inserted into the insertion inner wall portion. The oil path includes the restrict portion which is projected toward the center axis of the oil path more than the insertion inner wall portion of the oil path for restricting the movement of the filter, thereby being able to restrict the movement of the filter in the removing direction where the filter is removed from the main body. Also, in a state where the cooling apparatus is mounted on the internal combustion engine, the distance from the open end to the leading end portion of the main body existing upstream on the oil flow passage is set larger than the distance from such leading end portion to the restrict portion. Thus, after the main body is mounted on the internal combustion engine, even when the filter is unintentionally going to move in a direction where it is removed from the main body, the amount of the movement of the filter in the removing direction can be made smaller than the amount of the overlapping amount of the engaged portion between the filter and main body. This can prevent the removal of the filter effectively.

According to the third aspect of the invention, the multiple holes are formed in the bottom of the filter and, in a state where the main body is mounted on the internal combustion engine, there is formed the clearance between the bottom and restrict portion. Thus, even when the restrict portion has a shape to project inwardly in the oil path, the holes formed in the bottom will not be closed by the restrict portion but the oil flow passage can be secured, whereby the oil can be supplied to the piston smoothly.

According to the fourth aspect of the invention, the bottom includes the first surface and the second surface formed in a projecting shape or in a recessed shape in the oil flow passage direction with respect to the first surface, and the holes are formed in both of the first and second surfaces. Thus, for example, when a relatively large foreign substance is trapped by the filter, there is a fear that such substance can close the bottom greatly. However, since the first and second surfaces are formed with a level difference between them, a clearance is easy to be formed between the foreign substance and bottom (filtering surface), thereby securing the oil flow passage. This makes it possible to continue the supply of oil to the piston.

Also, the formation of the uneven shape in the bottom can enhance the rigidity of the bottom and thus the strength thereof such that it is hard to deform when it is contacted with the filter or when it receives oil pressure.

According to the fifth aspect of the invention, since the bottom of the filter is separated from the upper end face of the main body, there is formed a filter internal space inside the filter, thereby preventing the upper end face from closing the holes. Thus, the filter surface of the bottom of the filter can be used effectively and the filtering area of the bottom can be increased.

According to the sixth aspect of the invention, since the filter is mounted on the main body with such light pressure insertion operation that it can be easily mounted and removed manually, the filter mounting structure is simplified and thus the productivity is enhanced. Also, the mounting and removal of the filter with respect to the main body is facilitated and thus the maintenance work performance can also be enhanced.

According to the seventh aspect of the invention, since the filter and main body engagement structure is constituted of the threaded engagement between the female screw section formed in the filter and the male screw section formed in the main body, the filter can be easily mounted and removed simply by rotating it with respect to the main body and the maintenance work performance thereof can also be enhanced. Also, since the filter will not be removed from the main body unless it is rotated, in a state where the main body is mounted on the internal combustion engine, the filter is hard to be removed from the main body.

According to the eighth aspect of the invention, there are further included an engaging piece provided in one of the filter and main body and an engaging groove portion formed in the other. And, the engaging groove portion includes a first groove section allowing the movement of the engaging piece along the axial direction of the main body and a second groove section allowing the movement of the engaging piece along the rotation direction around the axis, while the two sections are formed to cross each other at a given angle. Thus, when the filter is inserted and rotated in such a manner that the engaging piece can pass through the first groove section and reach the second groove section, the filter can be easily held on the main body.

Also, since the filter will not be removed from the main body unless it is rotated, in a state where the main body is mounted on the internal combustion engine, the filter is hard to be removed from the main body.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Now, description is given below of several embodiments of the invention with reference to the accompanying drawings.

First Embodiment

In a first embodiment of the invention, description is given specifically of an apparatus for cooling a piston of an internal combustion engine applied to a motorcycle as an example of a saddle type vehicle with reference to FIGS. 1 to 6. Here, directions such as vertical and horizontal directions in this specification are defined as directions obtained when the accompanying drawings are viewed according to the reference numerals and signs of the specification.

Figure 1:
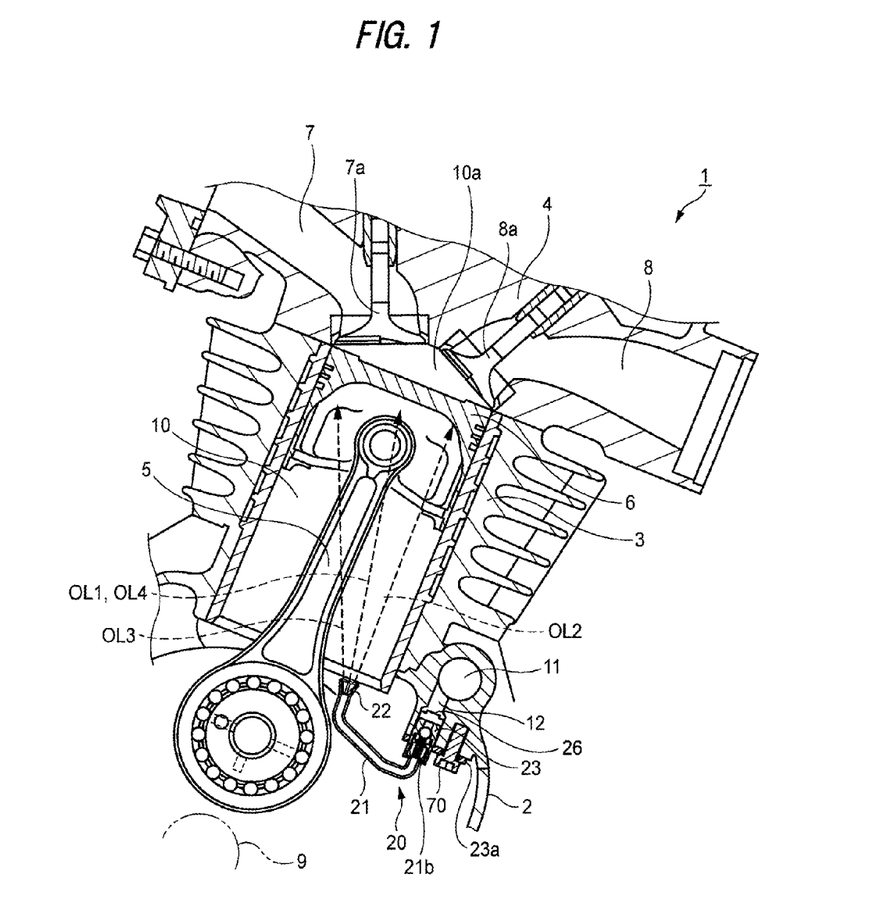
FIG. 1 is a section view of the main portions of an internal combustion engine, when viewed from the axial direction of a crankshaft provided in the internal combustion engine including a piston cooling apparatus according to a first embodiment.

In an internal combustion engine 1 according to this embodiment, as shown in FIG. 1, a cylinder bore 10 is defined by a cylinder 3 and a cylinder head 4 respectively disposed above a crank case 2. To a piston 6 movable vertically within the cylinder bore 10, from behind, there is connected a connecting rod 5 which is connected to a crankshaft 9.

Here, a suction port 7 and an exhaust port 8 are connected to a combustion chamber 10a surrounded by the upper surface of the piston 6 and cylinder bore 10, whereby suction and exhaust are carried out by opening/closing valves 7a, 8a at timings corresponding to combustion cycles.

A piston cooling apparatus 20 of this embodiment, as shown in FIG. 1, is disposed in the lower portion of the cylinder bore 10. The piston cooling apparatus 20 includes a main body 23 communicating with an oil path 12 connected to an oil gallery 11 formed in the internal combustion engine 1. The piston cooling apparatus 20 includes a substantially U-shaped nozzle pipe portion 21 which is extended from the lower end of the main body 23 toward within the cylinder bore 10. The nozzle pipe portion 21 includes in its leading end a leading end section having multiple oil injection ports 33 (see FIG. 2). Also, the base end 21b (see FIG. 3) of the nozzle pipe portion 21 is inserted and connected to the main body 23, while the main body 23 is fixed at a given portion within the crankcase 2 by a mounting screw 70 penetrating through a mounting hole 23b (see FIG. 4) of a main body fixing portion 23a.

Figure 2:
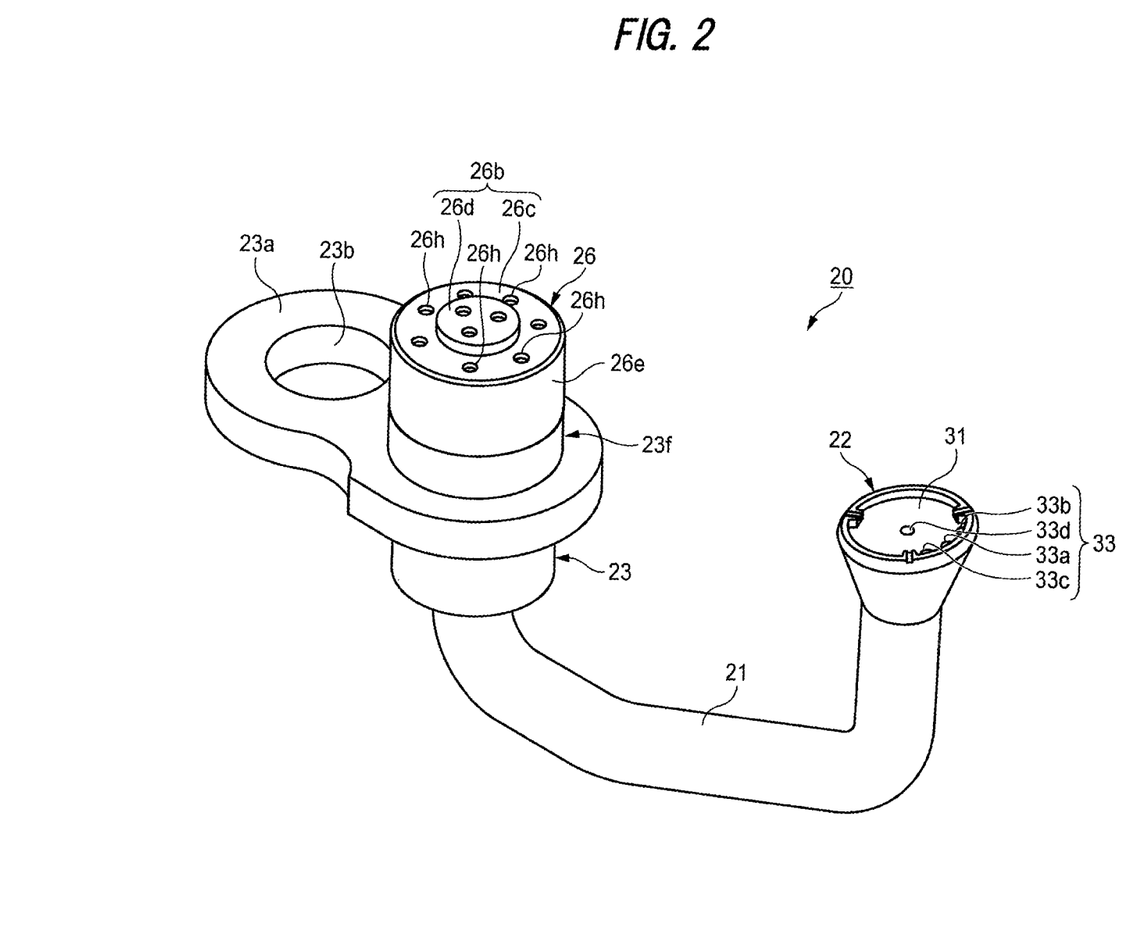
FIG. 2 is a perspective view of the piston cooling apparatus shown in FIG. 1.

Also, as shown in FIG. 2, in the piston cooling apparatus 20 of this embodiment, a filter 26 is provided on the outer wall 23f (existing upstream of the nozzle pipe portion 21 on the oil flow passage) of the main body 23. This filter 26, as described later, is removably mounted on the outer surface of the outer wall portion 23f.

Figure 3:
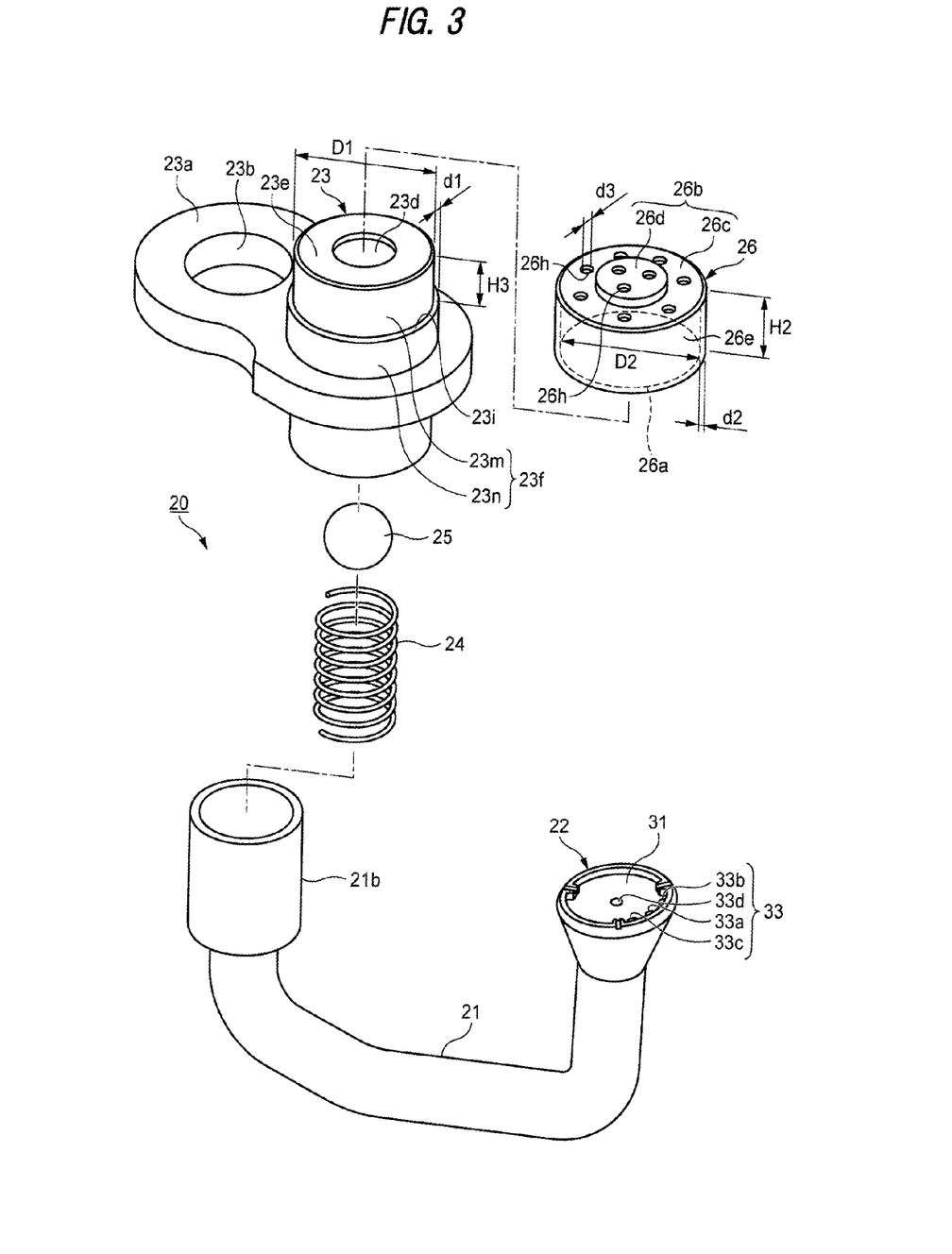
FIG. 3 is an exploded perspective view of the piston cooling apparatus shown in FIG. 2.
Figure 4:
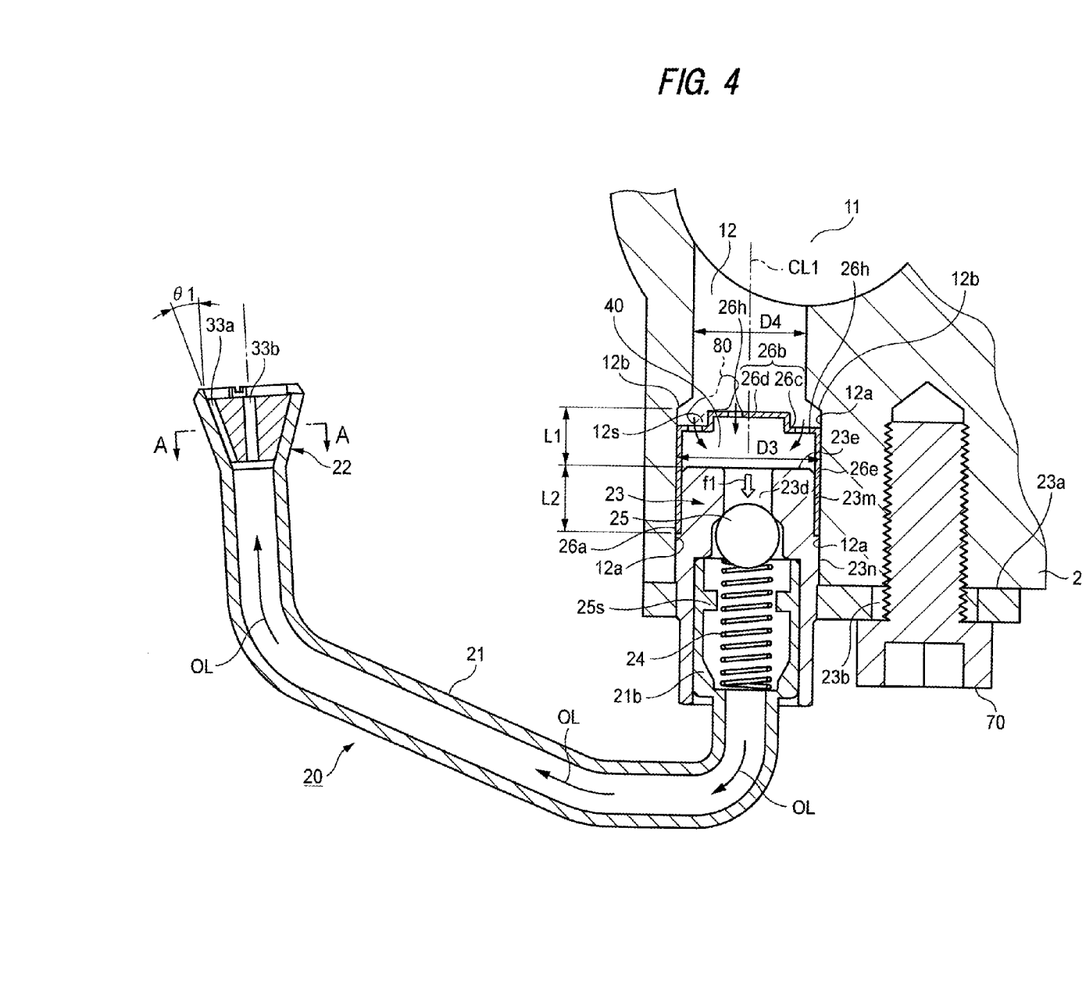
FIG. 4 is a section view of the main portions of the piston cooling apparatus shown in FIG. 2, showing a state where it is mounted.

As shown in FIGS. 2 and 3, the leading end section 22 has a substantially conical cone inverted structure. And, in the leading end face 31 of the leading end section 22, for example, there are formed a total of four oil injection ports 33 including first, second and third oil injection ports 33a, 33b and 33c respectively formed along the outer peripheral edge of the end face 31 and a fourth oil injection port 33d formed in the center thereof. The oil injection ports 33 are opened upwardly of the cylinder bore 10. And, oil OL supplied from an oil pump (not shown) is injected from the first~fourth oil injection ports 33a, 33b, 33c and 33d toward the back surface of the piston 6. Also, in the first~fourth oil injection ports 33a, 33b, 33c and 33d, as shown in FIG. 4, for example, an oil injection angle $\theta 1$ is set at a desired angle. Therefore, as shown in FIG. 1, the oil OL (OL1~OL4) can be blown direct onto such back surface of the piston 6 as faces the combustion chamber 10a, specifically, in the multiple portions thereof individually, thereby being able to cool the piston effectively.

As shown in FIGS. 3 and 4, the piston cooling apparatus 20 of this embodiment is structured such that it includes in its upper portion a substantially cylindrical main body 23 having a communication passage 23d communicating with the oil path 12, and a main body fixing portion 23a extended outward in the diameter direction from the outer peripheral surface of the main body 23, while the base end section 21b of the nozzle pipe portion 21 is inserted into the lower portion of the main body 23.

The base end section 21b, as shown in FIG. 4, is larger in diameter than the central portion of the nozzle pipe portion 21, while a compression spring 24 is mounted within the enlarged diameter section. Further, a check ball 25 is mounted within there while it is energized upward by the pressure spring 24. That is, the base end section 21b is inserted and fixed to the main body 23 with the compression spring 24 and check ball 25 mounted therein. Here, the base end section 21b has on its inner periphery a stopper 25s integrally formed therewith for restricting the amount of the movement of the check ball 25. Therefore, in the piston cooling apparatus 20, the check ball 25 is energized to close the communication passage 23d from below and, when oil pressure f1 from the oil passage 12 reaches or exceeds a given level, the communication passage 23d is opened to supply the oil OL into the nozzle pipe portion 21.

In this embodiment, the nozzle pipe portion 21 can be formed of metal, for example, a carbon steel pipe such as SWCH or STKM.

As described above, the main body 23 has the filter 26 upstream of the nozzle pipe portion 21 on the oil flow passage. The filter 26 has a bottomed cylindrical shape including, in one end, an open end 26a formed by opening one end (in FIG. 4, lower end) of the cylindrical outer peripheral section 26e and, in the other end, a bottom 26b. The bottom 26b has a two-stage structure. That is, the bottom 26b includes a first surface 26c and a second surface 26d formed above the first surface 26c (in the mounted state, it projects in the oil flow passage direction). The first and second surfaces 26c and 26d respectively have holes 26h. Thus, a foreign substance incapable of passing through the holes 26h is trapped on the outer surface side of the bottom 26b. This prevents the foreign substance 80 from entering the cooling apparatus 20.

As shown in FIG. 4, when a relatively large foreign substance 80 is trapped by the filter 26, the foreign substance 80 may close the bottom 26b extensively. However, in this embodiment, since the bottom 26b of the filter 26 has the two-stage structure including the first surface 26c and second surface 26d with a level difference between them, a clearance 12s is easily formed between the foreign substance 80 and bottom 26b (filtering surface). The clearance 12s can secure the oil flow passage, thereby being able to continue supplying the oil to the piston 6.

Also, the uneven shape of the bottom 26b can enhance the rigidity of the bottom 26b. Thus, although the foreign substance 80 trapped increases the oil pressure, the strength of the bottom 26b can be enhanced so that it is hard to be deformed by such oil pressure and foreign substance.

Also, the outer wall portion 23f of the main body 23 includes an upper outer wall section 23m for mounting the outer peripheral portion 26e of the filter 26 thereon and a lower outer wall section 23n having a larger diameter than the upper wall section 23m with a level difference d1 in the diameter direction. Here, the outside diameter D1 of the upper outer wall section 23m is slightly larger than the inside diameter D2 of the outer peripheral portion 26e of the filter 26 such that the outer peripheral portion 26e can be fitted into the upper outer wall section 23m with a slight insertion force. Therefore, the outer peripheral portion 26e of the filter 26 can be removably fitted into the upper outer wall section 23m by a light pressure insertion operation.

Here, in this specification, the term "light pressure insertion operation" means an insertion operation of such degree that the filter 26 can be manually mounted onto and removed from the outer wall portion 23f by an operator.

Also, when the filter 26 is pushed into the upper outer wall section 23m, the open end portion 26a is contacted with and secured to the stepped portion 23i of the main body 23. The axial-direction height H3 of the upper outer wall section 23m is set smaller than the height H2 of the outer peripheral portion 26e. Thus, the bottom 26b of the filter 26 and the leading end portion 23e of the main body 23 are spaced a given distance from each other, thereby providing a filter internal space 40 (see FIG. 4). The level difference d1 of the stepped portion 23i and the thickness d2 of the outer peripheral portion 26e of the filter 26 are set substantially the same. Therefore, the outer peripheral portion 26e and lower outer wall section 23n form substantially the same outer peripheral surface.

Thus, since the filter internal space 40 is formed between the bottom 26b of the filter 26 and the leading end portion 23e of the main body 23, the filter surface of the bottom 26b of the filter 26 can be used effectively. That is, the holes 26h formed in the outer edge of the bottom 26b will not be closed by the leading end portion 23e but a large filtering area can be secured in the bottom 26b.

When mounting the piston cooling apparatus 20 of this embodiment, with the filter 26 mounted on the main body 23 (a state shown in FIG. 2), the apparatus 20 is inserted into the insertion inner wall portion 12a of the oil path 12 formed inside the crankcase 2 (see FIG. 4). After then, the apparatus 20 is fixed by the mounting screw 70 penetrated through the mounting hole 23b. In this mounted state, the filter 26 is held such that the outer peripheral portion 26e thereof is inserted between the insertion inner wall portion 12a of the oil path 12 and the upper outer wall section 23m of the outer wall portion 23f, with the bottom 26b inserted into the oil path 12.

Thus, the filter 26 is removably mounted on the main body 23, specifically, on the outer surface of the upstream side outer wall portion 23f of the main body 23 using the above engagement structure. Accordingly, with the filter 26 held on the main body 23, the piston cooling apparatus 20 can be easily mounted onto and removed from the internal combustion engine 1.

Also, since the filter 26 can be accessed directly simply by removing the main body 23 of the piston cooling apparatus 20 from the internal combustion engine 1, maintenance work such as filter replacement can be performed easily. Further, since a portion of the filter 26, namely, the bottom 26b is disposed within such portion of the oil path 12 as exists upstream of the main body 23, the filter 26 will never slip off into a space existing on the piston side.

Also, in this embodiment, the oil path 12 includes a restrict portion 12b which projects more toward the oil passage center axis CL1 of the oil path 12 than the insertion inner wall portion 12a. That is, the inside diameter D4 of the restrict portion 12b of the oil path 12 is set smaller than the inside diameter D3 of the insertion inner wall portion 12a.

Figure 5:
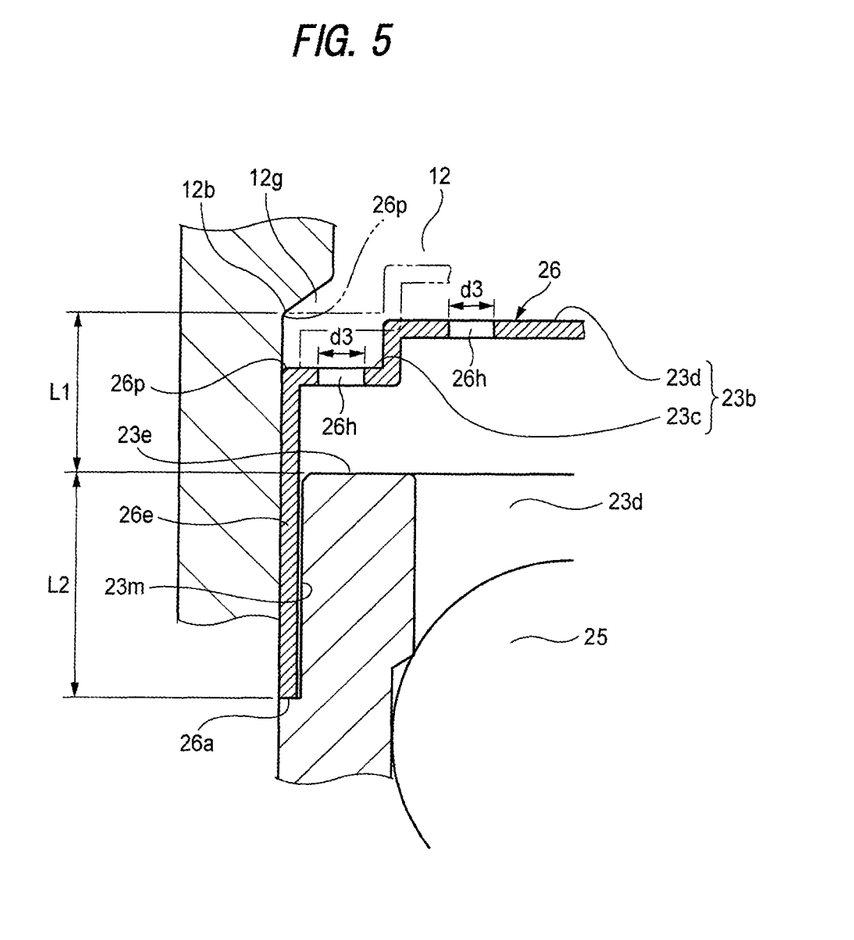
FIG. 5 is an enlarged section view of the main portions of the piston cooling apparatus shown in FIG. 4, showing a state where it is mounted.
Figure 6:
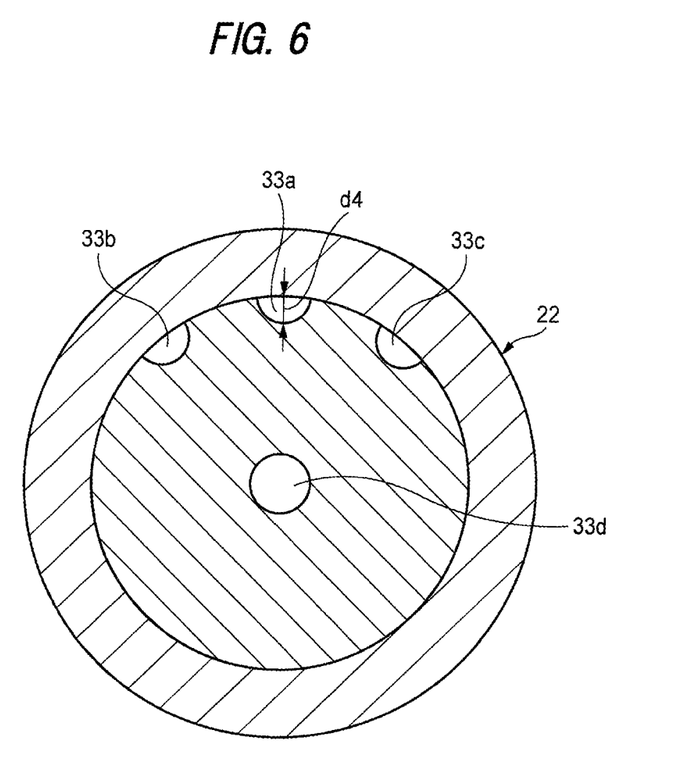
FIG. 6 is a section view taken along the A-A line shown in FIG. 4.

Thus, when the filter 26 moves in a direction (in the drawings, in an upper direction) where it removes from the upper outer wall section 23m, as shown by an imaginary line in FIG. 5, the outer peripheral edge portion 26p of the bottom 26b is contacted with the restrict portion 12b, thereby restricting the movement of the filter 26.

In this embodiment, the distance L2 from the open end 26a to the leading end portion 23e of the main body 23 is set larger than the distance L1 from the leading end portion 23e to the restrict portion 12b. Therefore, even when the filter 26 moves to a position where the outer peripheral edge portion 26p is contacted with the restrict portion 12b, the open end 26a of the filter 26 can remain overlapped with the upper outer wall section 23m.

Thus, since the restrict portion 12b for restricting the movement of the filter 26 is formed in the oil path 12, with the main body 23 mounted on the internal combustion engine 1, the movement of the filter 26 is restricted. Also, in a state where the main body 23 is mounted on the internal combustion engine 1, the distance L2 from the open end 26a to the leading end portion 23e of the main body 23 is set larger than the distance L1 from the leading end portion 23e to the restrict portion 12b. Therefore, after the main body 23 is mounted on the internal combustion engine 1, even when the filter 26 moves unexpectedly in a direction to part away from the main body 23, the outer peripheral portion 26e is prevented from being removed from the upper outer wall section 23m, thereby being able to prevent the removal of the filter 26 effectively.

In this embodiment, as shown in FIGS. 4 and 5, in a state where the main body 23 is mounted on the internal combustion engine 1, a clearance 12g is formed between the first surface 26c of the bottom 26b and restrict portion 12b.

Thus, since, with the main body 23 mounted on the internal combustion engine 1 the clearance 12g is formed between the bottom 26b and restrict portion 12b, even when the restrict portion 12b has a shape which protrudes inwardly of the oil path, the holes 26h formed in the bottom 26b will never be closed by the restrict portion 12b. This secures the oil flow passage, whereby the oil can be supplied to the piston 6 smoothly.

In this embodiment, the diameter d3 of the hole 26h of the filter 26 is set smaller than the minimum diameter d4 (see FIG. 6) of the oil injection port 33. This prevents the oil injection port 33 from being closed by a minute foreign substance having passed through the hole 26h.

According to the engagement structure of this embodiment, as described above, the filter 26 is mounted on the main body 23 with such light pressure insertion operation as enables an operator to manually mount and remove the former with respect to the latter easily. This simplifies the filter mounting structure, thereby being able to enhance the productivity. Also, the filter 26 can be easily mounted onto and removed from the main body 23 manually. This can enhance the maintenance performance of the piston cooling apparatus 20.

Figure 7:
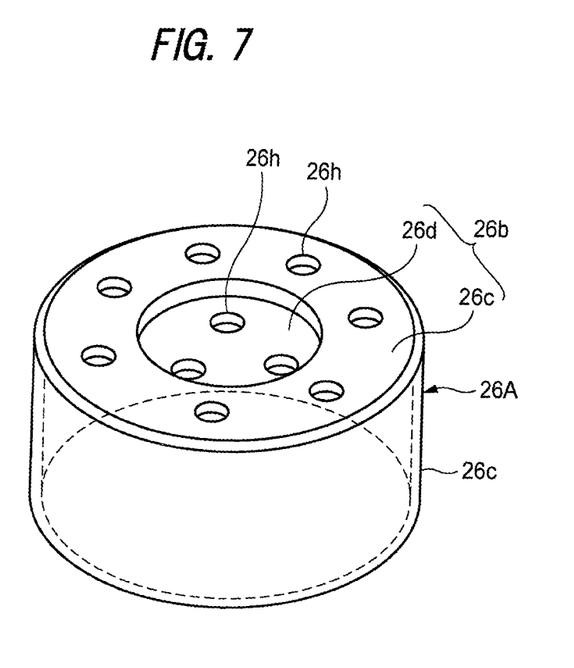
FIG. 7 is a perspective view of a modification of the filter according to the first embodiment.

Also, the filter structure of this embodiment can also be formed to have such a shape as shown in FIG. 7. In this filter 26A, a second surface 26d formed in the central area of the bottom 26b has a recessed shape which, in the mounted state of the piston cooling apparatus 20, is recessed from the first surface 26c toward downstream on the oil flow passage. In this case as well, there can be provided similar effects to the above-mentioned projectingly shaped filter.

Second Embodiment

Now, description is given below of a second embodiment with reference to FIG. 8.

In a piston cooling apparatus 20B according to the second embodiment of the invention, while the illustration and description of the same structures of the apparatus 20B as the above-mentioned first embodiment are omitted, there are illustrated only the structures thereof and their peripheral structures different from the first embodiment. Here, FIG. 8 is an exploded perspective view of the piston cooling apparatus 20B of the second embodiment.

Figure 8:
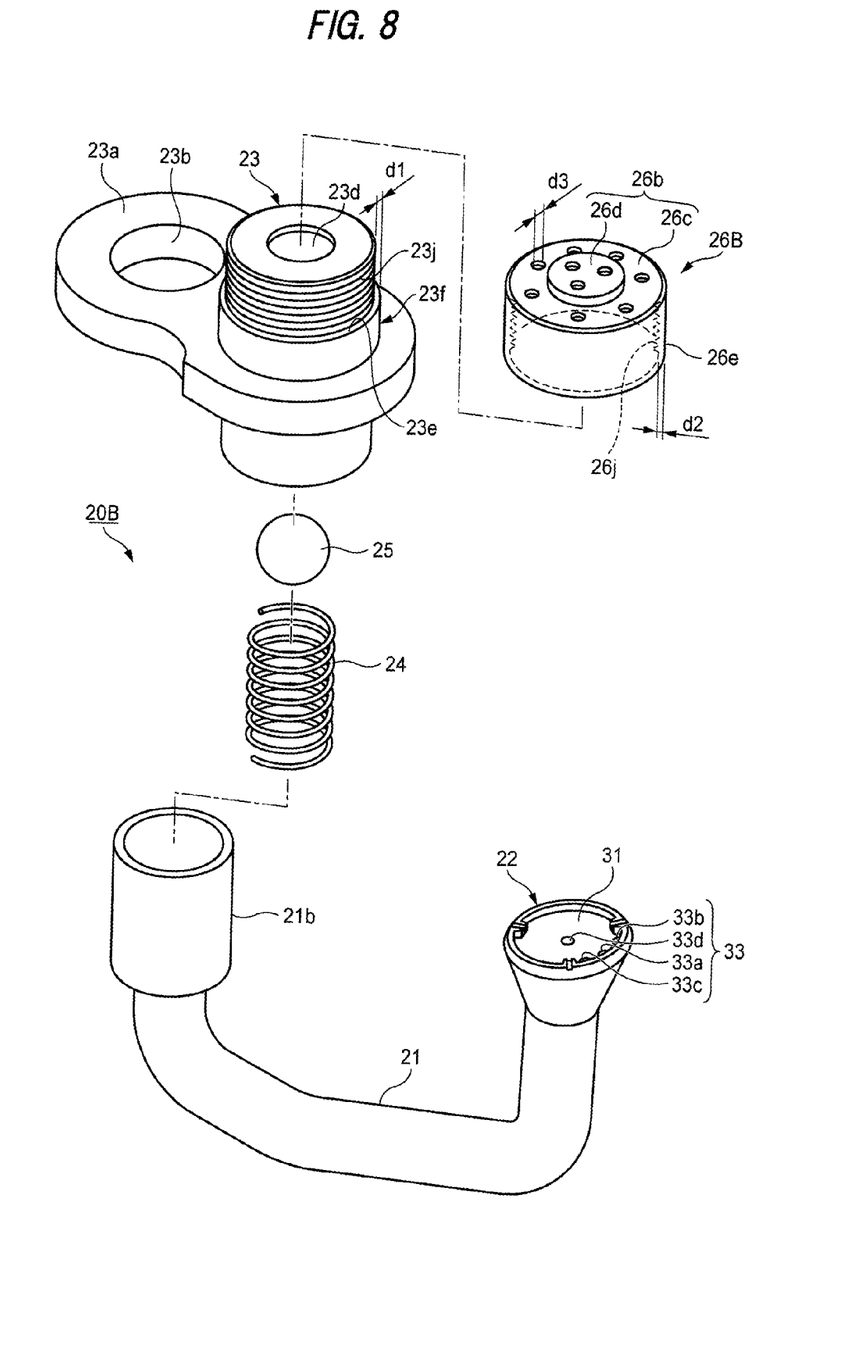
FIG. 8 is an exploded perspective view of a piston cooling apparatus according to a second embodiment.

The filter 26B of the piston cooling apparatus 20B shown in FIG. 8, similarly to the first embodiment, has a bottomed cylindrical shape. However, in this embodiment, a female screw section 26j is formed in the inner surface of outer peripheral portion 26e. On the other hand, in the main body 23, a male screw section 23j is formed in the outer wall portion 26e. When the male screw portion 23j and female screw portion 26j are threadedly engaged with each other, the filter 26B is mounted onto the main body 23.

According to the engagement structure of the main body 23 and filter 26B in this embodiment, through the threaded engagement of the female screw section 26j and male screw section 23j, the filter 26B can be mounted onto the main body 23 integrally therewith. Therefore, simultaneously with the mounting and removal of the piston cooling apparatus 20B, the filter 26B can be mounted and removed. Also, without using any equipment or tool specially, the filter 26B can be mounted onto and removed from the main body 23 simply by rotating it with respect to the main body 23. This can enhance the maintenance performance of the piston cooling apparatus 20B.

And, since the filter 26B will not be removed from the main body 23 unless it is rotated, in a state where the main body 23 is mounted on the internal combustion engine 1, the filter 26B is hard to be removed from the main body 23.

Third Embodiment

Now, description is given below of a third embodiment of the invention with reference to FIG. 9.

In a piston cooling apparatus 20C according to the third embodiment of the invention as well, while the illustration and description of the same structures of the apparatus 20C as the above-mentioned first embodiment are omitted, there are illustrated only the structures thereof and their peripheral structures different from the first embodiment. Here, FIG. 9 is an exploded perspective view of the piston cooling apparatus 20C of the third embodiment.

Figure 9:
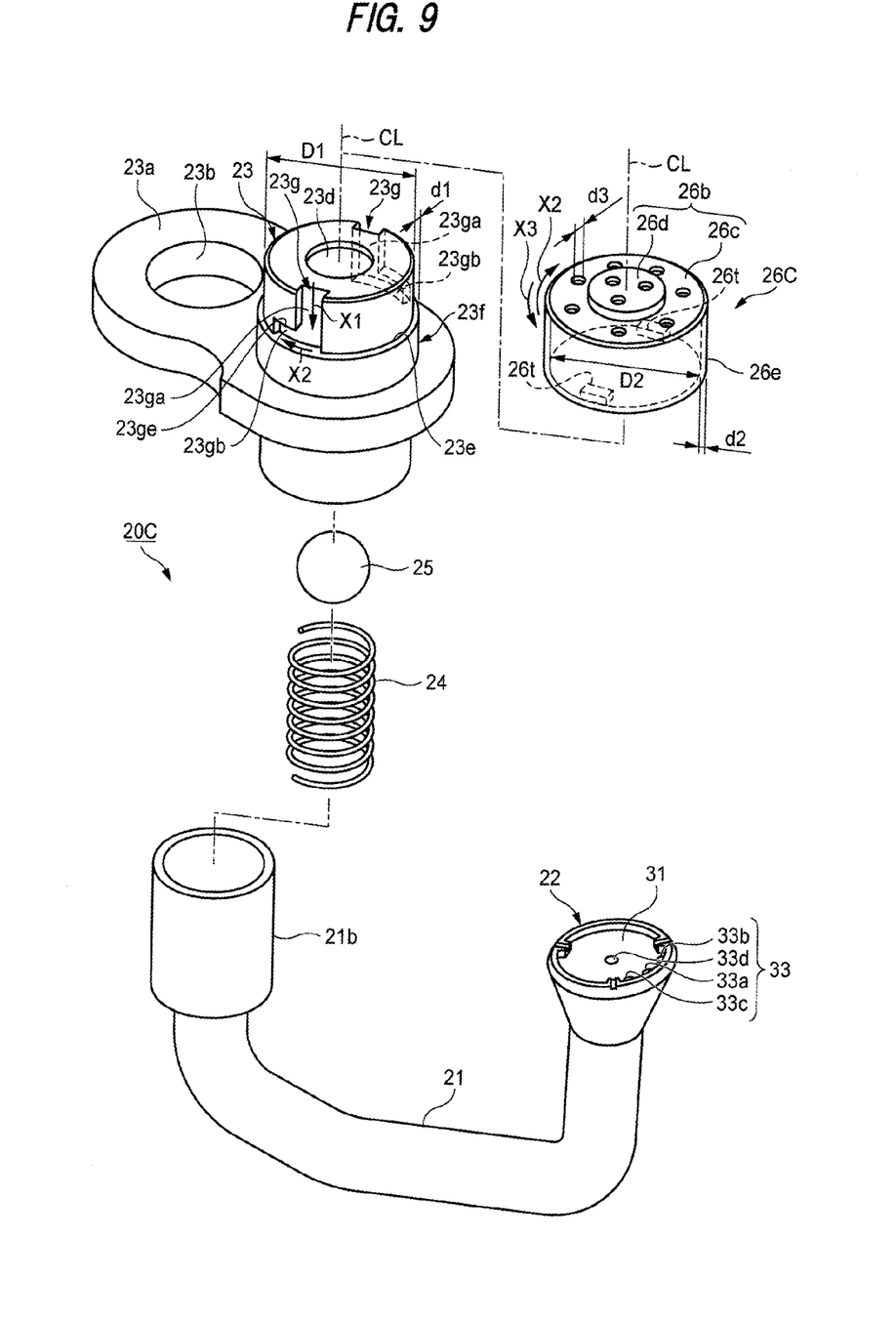
FIG. 9 is an exploded perspective view of a piston cooling apparatus according to a third embodiment.

As shown in FIG. 9, the filter 26C of the piston cooling apparatus 20C, similarly to the first embodiment, has a bottomed cylindrical shape. However, in this embodiment, inside the outer peripheral portion 26e, there are disposed a pair of engaging pieces 26t which respectively project in a direction crossing an axial line CL. Also, the main body 23 includes in its outer wall portion 23f a pair of engaging groove portions 23g respectively for receiving their associated engaging pieces 26t. Each engaging groove portion 23g includes a first groove section 23ga for allowing the movement of the engaging piece 26t along the axial line CL of the main body 23, and a second groove section 23gb crossing the first groove section 23ga at a given angle (in this embodiment, at an angle of substantially 90°).

Here, the second groove section 23gb is formed to allow the movement of the engaging piece 26t along the rotation direction around the axial line CL of the main body 23. And, in this embodiment, the dimensions of the outside diameter D1 of the upper outer wall section 23m and the inside diameter D2 of the outer peripheral portion 26e, differently from the light pressure insertion operation of the first embodiment, are set such that the filter 26C can be slightly loosely engaged with the upper outer wall section 23m, whereby the filter 26C can be rotated and moved relatively easily.

To mount the thus structured filter 26C, firstly, the filter 26C is inserted into the main body 23 (in the arrow X1 direction) in such a manner that the engaging pieces 26t are engaged into the first groove sections 23ga. Next, after the filter 26C is inserted to the deep side of the main body 23, the engaging pieces 26t are rotated (in the arrow X2 direction) along the second groove sections 23gb. Thus, the engaging pieces 26t are held in such a manner that they are caught on the upper edges 23ge of the second groove sections 23gb. Therefore, the filter 26C is surely secured such that it is prevented against removal from the main body 23. Also, to remove the filter 26C, when it is rotated in the opposite direction (in the arrow X3 direction) to the mounting direction, it can be removed easily.

Here, although not limitative specially, in this embodiment, for example, the shape of the upper edge 23ge of the second groove section 23gb may also be a tapered shape the groove width (the vertical-direction width of the main body 23) of which narrows toward the terminal end of the second groove section 23gb (in the arrow X2 direction, the deep side). That is, according to the tapered shape of the upper edge 23ge, since the engaging pieces 26t are allowed to advance to the deep side along the second groove sections 23gb due to the rotational operation in the arrow X2 direction, the engaging pieces 26t and upper edges 23ge can be secured while they are contacted with each other. Therefore, the engaging pieces 26t and upper edges 23ge can be secured without shaking and thus the filter 26C can be positively held on the main body 23.

Thus, the engagement structure of the filter 26C and main body 23 is constituted of the engaging pieces 26t and engaging groove portions 23g and also, with the groove structure of the first and second groove sections 23ga and 23gb of the engaging groove portions 23, the engaging pieces 26t can be secured within the engaging groove portions 23g using the movement of the engaging pieces 26t in the main body axial direction and the rotational movement of the engaging pieces 26t in the main body circumferential direction. This allows the filter 26C to be formed integrally with the main body 23. Therefore, simultaneously when the piston cooling apparatus 20C is mounted and removed, the filter 26C can be mounted and removed. Also, since the filter 26C can be easily mounted onto and removed from the main body 23 simply by inserting/removing and rotating the filter 26C with respect to the main body 23 without using special equipment or tool, the maintenance performance can be enhanced. Further, since the filter 26C will not be removed from the main body 23 unless it is rotated, in a state where the main body 23 is mounted on the internal combustion engine 1, the filter 26C is hard to be removed from the main body 23.

Although the first to third embodiments have been described heretofore with reference to the piston cooling apparatus for use in the internal combustion engine of a motorcycle, this is not limitative but the invention can also be applied to various internal combustion engines for use in various vehicles such as an ATV, a four-wheeled vehicle.

In the first to third embodiments, the structure for mounting the filters 26, 26A, 26B and 26C includes the stepped section 23*i* in the outer wall portion 23*f* of the main body 23. However, there can also be employed a structure which does not include the stepped section 23*i*.

According to the first to third embodiments, in the filters 26, 26A, 26B and 26C, the second surface 26*d* is formed to have a circular shape. However, the shape of the second surface 26*d* may not be a circular shape but it may be, for example, a polygonal shape.

Also, in the third embodiment, the securing structure of the filter 26C is constituted of the projection-shaped engaging pieces 26*t* provided on the filter 26C and the groove-shaped engaging groove portions 23*g* formed in the main body 23. However, in the invention, the projection shape may also be provided on the main body 23 and the groove shape may be formed in the filter 26C.

What is claimed is:

1. A piston cooling apparatus to be mounted on an internal combustion engine, comprising:
    a main body including a communication passage communicating with an oil path formed in the internal combustion engine;
    a nozzle pipe portion including an oil injection port configured to inject oil having passed through the communication passage toward a piston; and
    a filter disposed upstream of the nozzle pipe portion on a flow passage of the oil and including a hole having a smaller diameter than a minimum diameter of the oil injection port, the oil being injected toward the piston from the oil injection port, wherein:
    the filter is removably mounted on an end portion of the main body existing upstream on the oil flow passage; and
    the main body is mounted on the internal combustion engine in a state where at least a portion of the filter is inserted into the oil path formed inside a crankcase of the internal combustion engine.

2. The piston cooling apparatus according to claim 1, wherein:
    the filter is formed to have a bottomed cylindrical shape including an open end formed by opening one end of a cylindrical outer periphery portion in one end, and a bottom having the hole in an other end;
    the filter is inserted into the insertion inner wall portion of the oil path in a state where the outer wall portion of the main body is inserted from the open end side into the outer peripheral portion and is engaged therewith;
    the oil path includes a restrict portion projected toward an oil passage center axis more than the insertion wall portion; and
    a distance from the open end to a leading end portion, existing upstream on the oil flow passage, is set larger than a distance from the leading end portion of the main body to the restrict portion, in a state where the main body is mounted on the internal combustion engine.

3. The piston cooling apparatus according to claim 2, wherein:
    the filter includes multiple holes; and
    a clearance is formed between the bottom and the restrict portion in a state where the main body is mounted on the internal combustion engine.

4. The piston cooling apparatus according to claim 2, wherein
    the bottom includes a first surface and a second surface formed in a projecting shape or in a recessed shape in the oil flow passage direction with respect to the first surface; and
    the holes are formed in both of the first surface and the second surface.

5. The piston cooling apparatus according to claim 2, wherein
    the filter is disposed in such a manner that the bottom and the leading end portion of the main body are separated from each other in a state where it is mounted on the main body.

6. The piston cooling apparatus according to claim 1, wherein the filter is formed to have a bottomed cylindrical shape including an outer peripheral portion and the filter is mounted onto the main body with such light pressure insertion operation as enables the outer peripheral portion to be mounted onto and be removed from the outer wall portion.

7. The piston cooling apparatus according to claim 1, wherein:
    the filter is formed to have a bottomed cylindrical shape including an outer peripheral portion; and
    a female screw section formed in an inner surface of the outer peripheral portion is threadedly engaged with a male screw section formed in an outer wall portion of the main body.

8. The piston cooling apparatus according to claim 1, further comprising:
    an engaging piece provided in one of the filter and the main body and projected in a direction crossing an axis of the main body; and
    an engaging groove portion formed in the other of the filter and the main body configured to receive the engaging piece, wherein
    the engaging piece and the engaging groove portion is engaged with each other; and
    the engaging groove portion includes a first groove section allowing the movement of the engaging piece along the axis and a second groove section allowing the movement of the engaging piece along a rotation direction around the axis.

* * * * *